(12) United States Patent
Choi et al.

(10) Patent No.: US 7,571,155 B2
(45) Date of Patent: Aug. 4, 2009

(54) SYSTEM AND METHOD FOR GENERATING A SEARCH RESULT LIST

(75) Inventors: Kyung Lak Choi, Seoul (KR); Joon Hong, Seoul (KR); Woo Sung Lee, Seoul (KR); Sang Keun Lee, Seoul (KR); Jin Soo Lim, Pusan (KR)

(73) Assignee: NHN Corporation, Seoul (KR)

( * ) Notice: Subject to any disclaimer, the term of this patent is extended or adjusted under 35 U.S.C. 154(b) by 66 days.

(21) Appl. No.: 10/537,935

(22) PCT Filed: Nov. 27, 2003

(86) PCT No.: PCT/KR03/02587

§ 371 (c)(1), (2), (4) Date: Jun. 8, 2005

(87) PCT Pub. No.: WO2004/055618

PCT Pub. Date: Jul. 1, 2004

(65) Prior Publication Data
US 2006/0020516 A1    Jan. 26, 2006

(30) Foreign Application Priority Data
Dec. 14, 2002  (KR)  ............ 10-2002-0080066
Mar. 7, 2003   (KR)  ............ 10-2003-0014486

(51) Int. Cl.
G06F 17/30   (2006.01)
G06F 7/60    (2006.01)
(52) U.S. Cl. ............................. 707/3; 707/1; 707/14
(58) Field of Classification Search ............... 707/1, 707/14, 3; 705/37, 26, 35, 36
See application file for complete search history.

(56) References Cited

U.S. PATENT DOCUMENTS

2001/0039524 A1 * 11/2001 Harrison et al. ............... 705/35

(Continued)

FOREIGN PATENT DOCUMENTS

JP    2001-265965    9/2001

(Continued)

OTHER PUBLICATIONS

Steven Vonder Haar; "ZDNET News", Published Feb. 23, 1999; Publication Source-ZDNET(www.zdnet.co.jp).

*Primary Examiner*—Charles Rones
*Assistant Examiner*—Fariborz Khoshnoodi
(74) *Attorney, Agent, or Firm*—Ladas & Parry LLP

(57) ABSTRACT

The present invention relates to a system and method for generating a search result list in response to a search request through a communication network. A method for generating a search list according to the present invention comprises the steps of selling keywords associated with predetermined search list order display methods through a tender, maintaining a database including a plurality of search list orders, receiving the search request from a searcher, identifying the search list orders associated with the keywords corresponding to the search request, and arranging at least a portion of the search list orders according to the predetermined search list order display methods. According to the present invention, a purchase competition for a particular keyword is mitigated and selling prices for keywords can be determined at a proper level.

30 Claims, 14 Drawing Sheets

U.S. PATENT DOCUMENTS

2001/0056396 A1* 12/2001 Goino .......................... 705/37
2002/0165849 A1* 11/2002 Singh et al. .................... 707/1
2004/0193489 A1* 9/2004 Boyd et al. ................... 705/14

FOREIGN PATENT DOCUMENTS

| | | |
|---|---|---|
| JP | 2001-283049 | 10/2001 |
| JP | 2001-306925 A | 11/2001 |
| JP | 2002-024620 | 1/2002 |
| JP | 2002-063474 A | 2/2002 |
| JP | 2002-269436 | 9/2002 |
| KR | 2001-0074089 | 8/2001 |
| KR | 2001-0092922 | 10/2001 |
| KR | 2002-0035057 | 5/2002 |
| KR | 2003-0076545 | 9/2003 |
| WO | 00/73960 A1 | 12/2000 |
| WO | 01/90947 A1 | 11/2001 |

* cited by examiner

SYSTEM AND METHOD FOR GENERATING A SEARCH RESULT LIST

TECHNICAL FIELD

The present invention relates to a system and method for generating a search result list in response to a search request through a communication network, and more particularly, to a system and method for selling a predetermined search list order display method and associated keywords to network information providers by way of a tender system and generating a search result list associated with the keywords based on the results of the selling.

BACKGROUND ART

Nowadays, with the rapid development of communication networks such as Internet and the like, information searches through the communication networks have been generalized. If a user attempts to access a desired search engine using an Internet access browser installed at his/her PC, he/she inputs a desired keyword in a search window. The input keyword is transferred to a search server of a search site (or portal site) via the communication networks. The search server including a search DB retaining a plurality of search list orders corresponding to the keywords transfers a search result list consisting of search list orders, as a result of the search request from the user, to the user's PC. The user can easily access a desired web site by clicking a search list order of the web site among the search result list displayed on a screen of his/her PC.

As the information search through the search site becomes greatly frequent in this way, search list order display methods for providing advertisements (for example, banner advertisements) associated with the keywords, which are inserted into a search result list screen or linked with the search list order, come into the spotlight day by day as new advertisement systems. In view of search site providers, these new advisement systems became a big profit source over paid contents services.

Further, as the frequency of exposure to network users and the number of inquiry by the users show a great difference depending on an occupation position of the search list order associated with a web site provided by the network information provider in a search result list, the occupation position of the search list order in the search result list has a significant influence on an advertisement effect of the web site. Accordingly, a "keyword selling" for connecting a search list order, which is disposed in a position within the search result list at which the frequency of exposure to network users and the number of inquiry by the users are high, with a web site of a particular network information provider has been generalized in search site businesses.

However, keyword selling systems conducted by conventional search sites adopt a first-come first-served selling system. This system is a system for setting start time of selling for a particular keyword in advance and determining a final purchaser on a first-come first-served basis among a plurality of purchase requests received after the start of the selling. However, this system has a big problem due to excessive purchase competition between many network information providers when they sell particularly favorite keywords (referred to as premium keywords in the art). In other words, there occurs a case where a selling system does not operate normally due to an overload imposed on a communication network as a plurality purchase requests rushes through the communication network in compliance with start time for selling, and, although a normal selling is achieved, there causes a problem in that a suspicion on selling fairness from network information providers who do not purchase their favorite keywords is raised. In addition, there is an inconvenience in that network information providers have to make much unnecessary efforts for first-come first-served purchase requests for their favorite keywords.

In view of the search sites, there is a difficulty in estimating selling prices of keywords in a highly competitive field.

There have been accordingly made efforts to sell keyword goods to network information providers at fair prices and offer a search result list reasonably by reflecting fair selling prices. Korean Patent Application No. 10-2001-7015234 discloses a method in which keywords are sold by an auction system and search list orders are aligned in a search result list according to the highest bid price by auction. The method disclosed in the above patent application adopts a system where network information providers pay in advance an amount of money corresponding to an expected number of clicks to select a search list order during a certain period of time and the amount of money is offset by the highest bit price by auction every time a click is made. However, since a position of a search list order is uniformly defined by one criterion of the highest bid price by auction even according to this selling system and the formation of search result list, there still exists a problem in that network information providers cannot select a position of a search list order or a variety of search list order display methods cannot be offered to them. In addition, in the above patent application, since the position of the search list order can be consecutively changed by reflecting an auction result in real time, there is a problem in that an advertisement effect originally intended by the network information providers may be reduced over time. In addition, owing to an inherent limitation to the auction system in determining keyword selling prices, there is an inevitable problem of unreasonable price decision due to an excessive competition.

DISCLOSURE OF INVENTION

The present invention is conceived to solve the aforementioned problem. An object of the present invention is to provide a method and system for selling keywords by means of a tender system and forming a search result list according to a selling result.

Another object of the present invention is to further activate keyword advertisement marketing by offering a variety of search list order display methods associated with keywords to network information providers.

A further object of the present invention is to mitigate a purchase competition for keywords between network information providers and to offer a convenience for purchase of keywords to network information providers.

A still further object of the present invention is to allow network information providers to select a selling system according to their preferences to keywords.

A still further object of the present invention is to set selling prices of keywords at a proper level.

A still further object of the present invention is to determine a successful bidder reasonably for a plurality of same bidding prices.

A still further object of the present invention is to select an effective selling system with regard to keyword selling in consideration of a temporal characteristic for search requests for keywords.

A still further object of the present invention is to allow network information providers to anticipate a position in a search result list at which a search list order associated with their own web sites is occupied and to consistently maintain an advertisement effect anticipated by them.

A still further object of the present invention is to uniformly maintain ranking of a search list order associated with network information providers.

A still further object of the present invention is to effectively offer advertisement marketing for a series of similar keywords to network information providers by offering keywords similar to a keyword to be tendered to them.

A still further object of the present invention is to include an image in a search list order in order to attract a searcher's interest, and to allow network information providers to input and correct information on a search list order easily.

In order to solve the problems in the conventional technique and accomplish the above objects, the present invention provides a method and system for generating a search result list in response to a search request through a communication network.

According to one aspect of the present invention for achieving the object, there is provided a method for generating a search result list, comprising the steps of receiving bidding prices and tender conditions including keywords and predetermined search list order display methods from network information providers, and making a successful bid for the keywords based on the tender conditions and the bidding prices, to sell the keywords associated with the predetermined search list order display methods through a tender, associating at least a portion of the search list orders with the keywords and the predetermined search list order display methods to maintain a database including a plurality of search list orders, receiving the search request from the searcher, identifying the search list orders associated with the keywords corresponding to the search request, and arranging the portion of the search list orders according to the predetermined search list order display methods.

According to another aspect of the present invention, there is provided a method for generating a search result list, comprising the steps of maintaining a plurality of search list orders including URLs associated with network information providers, receiving keywords associated with the search list orders and bidding prices associated with the keywords from the network information providers, selecting a successful bidder among a plurality of network information providers associated with the keywords according to a predetermined criterion associated with the bidding prices after a tender period of time expires, notifying the successful bidder of the selection results of the successful bidder, and generating a search result list including at least a portion of the plurality of search list orders in response to the search request, wherein the portion of the plurality of search list orders is arranged in a predetermined search list order placement position.

According to a further aspect of the present invention, there is provided a method for generating a search result list, comprising the steps of receiving tiles of web page, web page descriptions, image files, keywords and bidding prices associated with web pages of network information providers from the network information providers, generating search list orders in real time substantially by combining the titles of web page, the web page descriptions and the image files, and offering the generated search list orders to the network information providers, receiving confirmation inputs of the network information providers for the generated search list orders, selecting a successful bidder among a plurality of network information providers associated with the keywords according to a predetermined criterion associated with the bidding prices, associating the search list orders with the keywords, receiving the search request from the searcher, identifying the search list orders associated with a keyword corresponding to the search request, and offering the identified search list orders to the searcher by arranging the identified search list orders in a predetermined position of a search result web page.

According to a still further aspect of the present invention, there is provided a method for generating a search result list, comprising the steps of receiving keywords and bidding prices from network information providers, selecting a successful bidder among a plurality of network information providers associated with the keywords according to a predetermined criterion associated with the bidding prices, receiving a tile of web page, a web page description and an image file associated with a web page of the successful bidder from the successful bidder, generating search list orders in real time substantially by combining the title of web page, the web page description and the image file, and offering the generated search list orders to the successful bidder, receiving a confirmation input of the successful bidder for the generated search list orders, associating the search list orders with the keywords, receiving the search request from the searcher, identifying the search list orders associated with a keyword corresponding to the search request, and offering the identified search list orders to the searcher by arranging the identified search list orders in a predetermined position of a search result web page.

According to a still further aspect of the present invention, there is provided a system for generating a search result list, comprising a computer and a database, wherein the database includes a plurality of search list orders, the computer receives bidding prices for keywords associated with predetermined search list order display methods, makes a successful bid for the keywords based on the bidding prices, associates at least a portion of the search list orders stored in the database with successfully bidden keywords and the predetermined search list order display methods, identifies the search list orders having the keywords corresponding to the search request in response to the search request received from the searcher, and arranges the portion of the search list orders according to the search list order display methods.

BEST MODE FOR CARRYING OUT THE INVENTION

Hereinafter, a search result list generation method and system according to a preferred embodiment of the present invention will be described in detail with reference to the accompanying drawings.

Figure 1A:
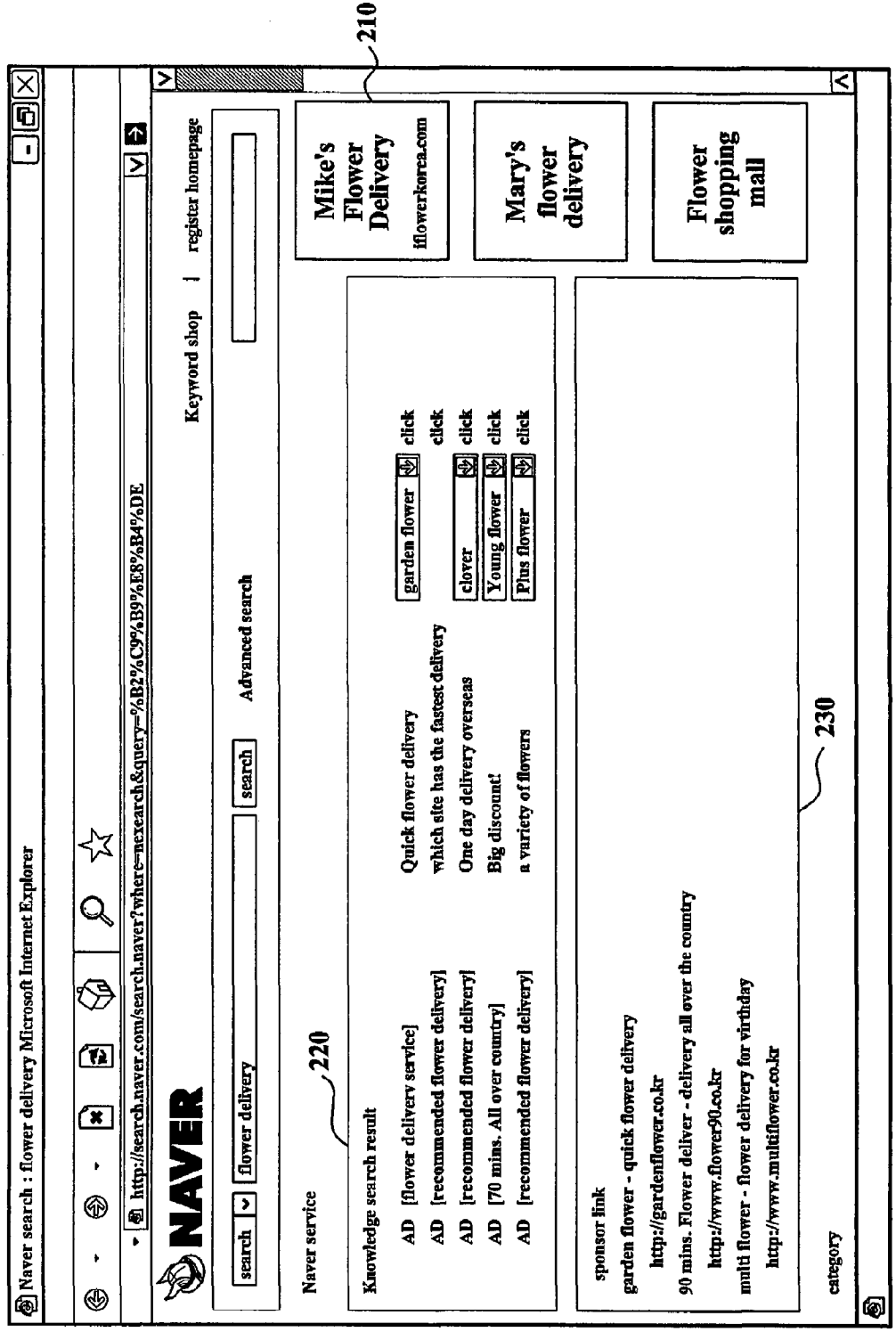
FIGS. 1a and 1b are views illustrating search results according to a search result list generation method of the present invention.
Figure 1B:
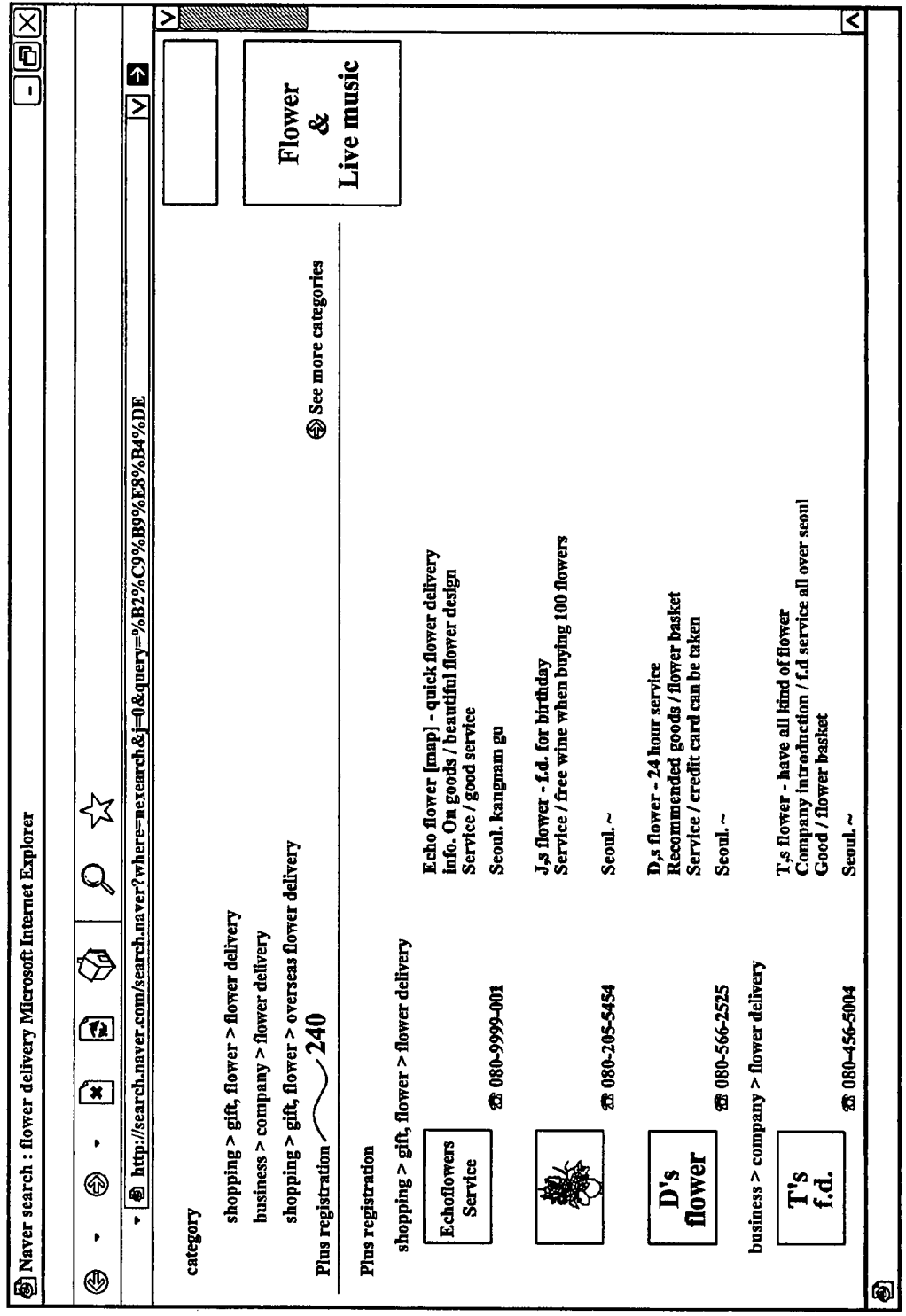

FIGS. 1a and 1b are views illustrating search results according to a search result list generation method of the present invention. As shown in FIGS. 1a and 1b, as a result of a search for a keyword, "flower delivery," a search result list arranging a plurality of search list orders is displayed according to a variety of search list order display methods. A search list order display method is for determining a form of display and ranking of search list order. In the present invention, a keyword, a form of display and ranking of search list order deal with single keyword goods, each of which is individually sold to network information providers by means of a tender system.

Examples of a form of display include a keyword banner 210, a knowledge search result 220, a sponsor link 230, a plus registration 240, and the like.

A form of display for the "keyword banner" 210 is a form of banner of a predetermined size created by a flash or an image at a first page where a search result list for a particular keyword is displayed, as shown in the right side of FIGS. 1a and 1b. Advertisement effects can be improved by publishing banner(s) of only one or some companies exclusively.

A form of display for the "knowledge search result" 220 can represent a characteristic of a site and a network information provider as a question format and can be linked to the site for a present word and a question itself. This is located in the uppermost of a united search result and offers an advertisement zone up to a certain ranking (the fifth position at maximum in FIG. 1a) for each keyword. As an example of a form of question, a single question has a form of shortcut to one site and multiple questions can move several sub pages in a corresponding home page by using a combo box for a single question.

A form of display for the "sponsor link" 230 displays a site title and a site description on a first page of a particular keyword search result. This is located at an upper portion of a united search and directory search result and offers an advertisement zone up to a certain ranking (the third position at maximum in FIG. 1a).

A form of display for the "plus registration" 240 is for showing additional information along with an image of a site in a search result and offers an easy and quick registration service by introducing an advertisement content directly described by a registrant and processing a registration procedure quickly.

In this way, there are a variety of forms of display for advertising web sites of network information providers in different ways, and positions at which search list orders associated with network information providers are located in a display zone of each form of display and their rankings can be determined. In view of the network information providers, by allowing them to select a form of display of the search list order and ranking of the search list order for a keyword, a method for maximizing advertisement marketing effects is offered.

In the present invention, since keyword goods are determined according to a combination of the keyword, the form of display and the ranking of the search list order for example, the second position in a knowledge search result for flower delivery and the third position in a sponsor link for flower delivery are perceived as individual goods and it is possible to sell these individual goods to network information providers. As an alternative embodiment, if keyword goods are determined by only the keyword and the form of display, for example, keyword goods for "flower delivery knowledge search result" can be sold to a plurality of network information providers.

In the present invention, keyword goods are sold to network information providers through a tender system. Traditional tender systems are systems in which a plurality of purchase applicants submit letters (tenders) on which a tender condition is written, the submitted tenders are opened after tender time expires, and then a person proposing the highest price is determined as a purchaser (successful bidder). The present invention is similar to the traditional tender systems in that desired purchase prices are secretly received from network information providers to wish to purchase keyword goods through a communication network, and then one or more network information providers proposing the highest price among the received purchase prices are selected as a successful bidder. By adopting a tender system instead of an auction system, the present invention overcomes a problem of the auction system that purchase prices are excessively rising due to opening of the desired purchase prices and a highest price is proposed immediately before the auction is ended in order to purchase keywords improperly.

Figure 2:
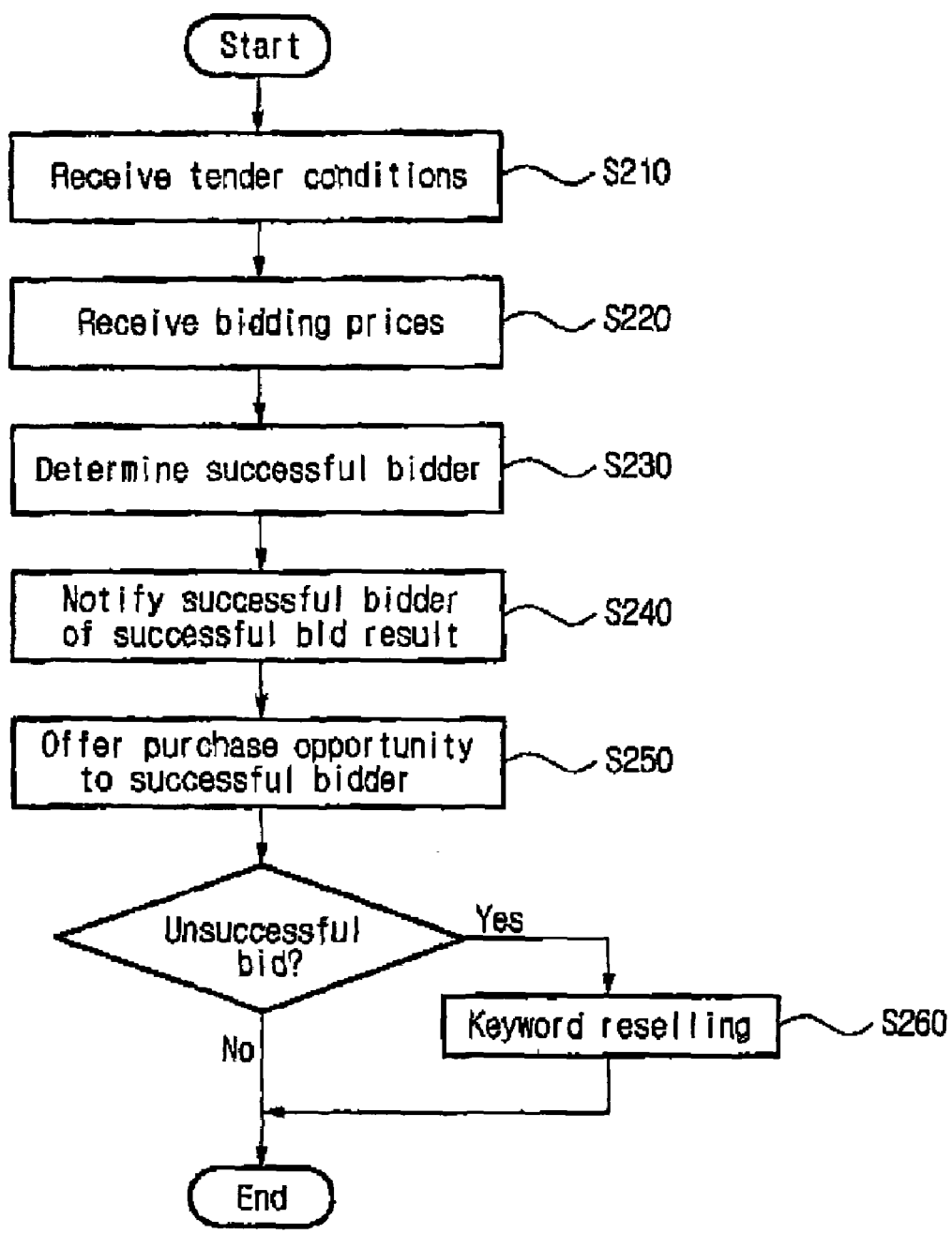
FIG. 2 is a flowchart illustrating a procedure for selling keyword goods according to a tender system in accordance with a preferred embodiment of the present invention.

FIG. 2 is a flowchart illustrating a procedure for selling keyword goods according to a tender system in accordance with the present invention. Now, a procedure for selling keyword goods will be described in detail for each step with reference to FIG. 2.

First, in step S210, a tender condition for keyword goods is received from network information providers through a communication network after tender time starts. In the present invention, since keyword goods determined by the keyword and the search list order display method is treated as a single keyword goods and a tender for each of them is made, tender conditions received from network information providers include information on the keyword and the search list order display method.

Keywords to be tendered may be all keywords, or a tender system may be adopted for only premium keywords highly popular among network information providers. The premium keywords can be defined based on a predetermined criterion.

For example, if frequency of a search request for a keyword exceeds a predetermined of number within a predetermined period of time, this keyword can be determined as a premium keyword. As another example, a purchasing power of a keyword can be considered. A system other than the tender system, for example, a first-come first-served system is applicable for general keywords other than the premium keywords.

As an alternative embodiment, a certain keyword can be sold by means of the tender system during only a certain period of time. For example, since a search request for a keyword, "ski" is frequent particularly in the winter season, the keyword can be sold through the tender system only in the winter season, but through other systems in seasons other than the winter season. In this way, the keyword can be more effectively sold by determining whether a tender system is selected in consideration of a temporal characteristic for a search request for a keyword.

The search list order display method included in the tender conditions can be specified by the form of display or the ranking of search list order or by only the form of display. Alternatively, the search list order display method can be specified by only a search list order placement position.

Figure 3:
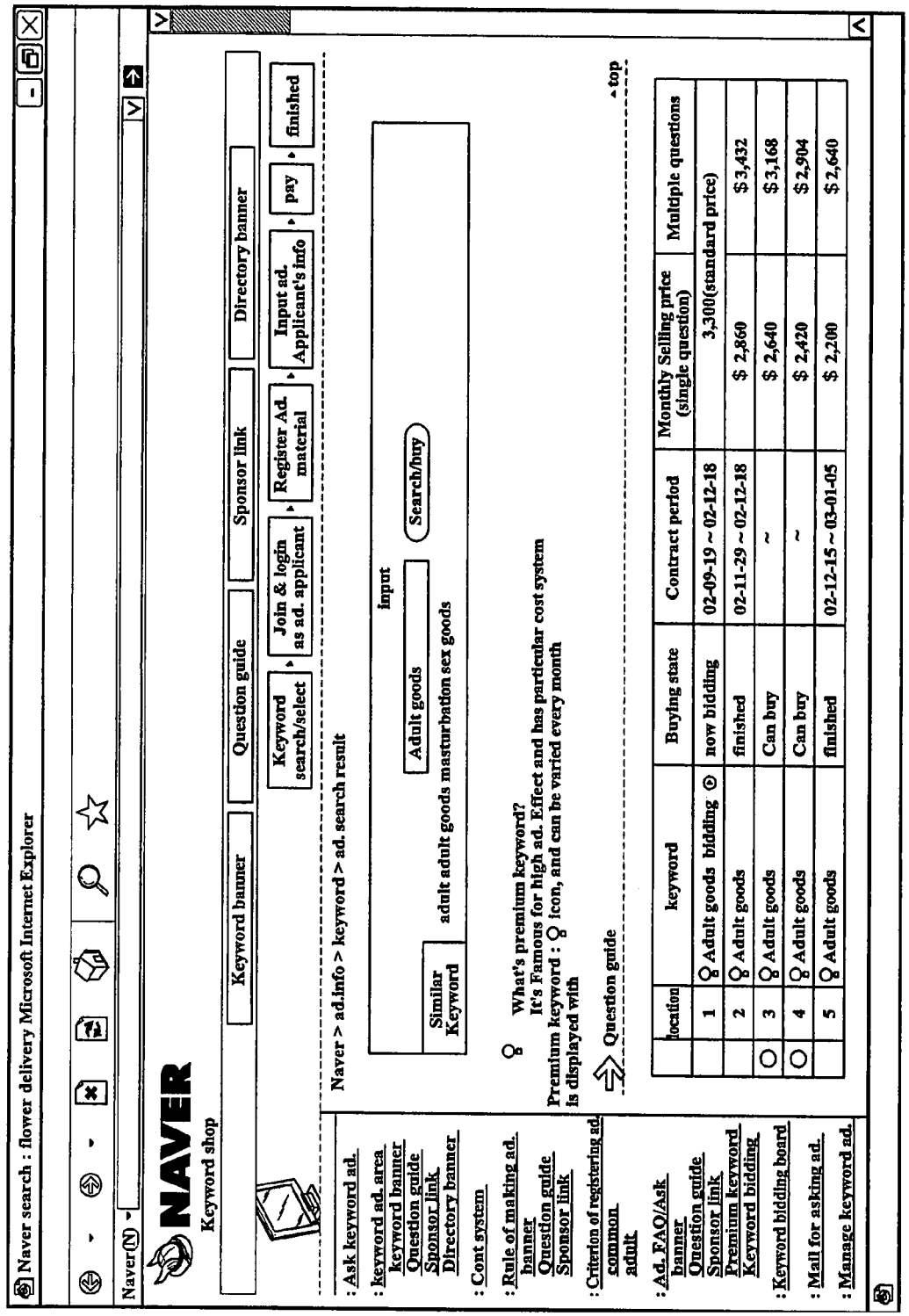
FIG. 3 is a view illustrating a tender particulars screen for receiving tender conditions.

As a preferred example for receipt of the tender conditions, a tender particulars screen as shown in FIG. 3 is offered to network information providers. When the network information providers click a tender button for a desired keyword and a search list order display method, the information on the tender conditions can be received automatically.

As another alternative embodiment, information on tendering network information providers can be additionally included in the tender conditions. Instead of separate inputs of the information on network information provider, by receiving a predetermined ID and a password predefined for each network information provider from the network information provider and allowing him/her to participate in a tender procedure by only completion of login procedure, authenticity of the information on the network information provider can be easily confirmed through the login procedure.

Alternatively, the tender conditions can additionally include a predetermined display period of time to display the search list order as the search list order display method. This display period of time may be one of criterions to determine a successful bidder in a successful bid step.

Next, in step S220, bidding prices are received from network information providers. In a preferred embodiment, in order to prevent a plurality of bidding prices with the same price from being received, bidding prices in the unit of 1 won (in Korean monetary unit) are received and last three digits in the bidding price cannot be "000". As another alternative embodiment, the bidding prices can be repeatedly received from the same network information provider may times, and, in this case, the most recent bidding price can be reflected as an effective bidding price. Alternatively, the number of receipts of the bidding prices from the same network information provider can be limited to a predetermined number (for example, 2 times or 3 times or so) or a separate additional cost can be demanded when the bidding price is received above the predetermined number.

Even before a tender period of time expires after the receipt of bidding prices, if a tender cancel is received from a bidding network information provider, it is considered that the receipt of tender conditions and bidding prices has not been presented.

Figure 4:
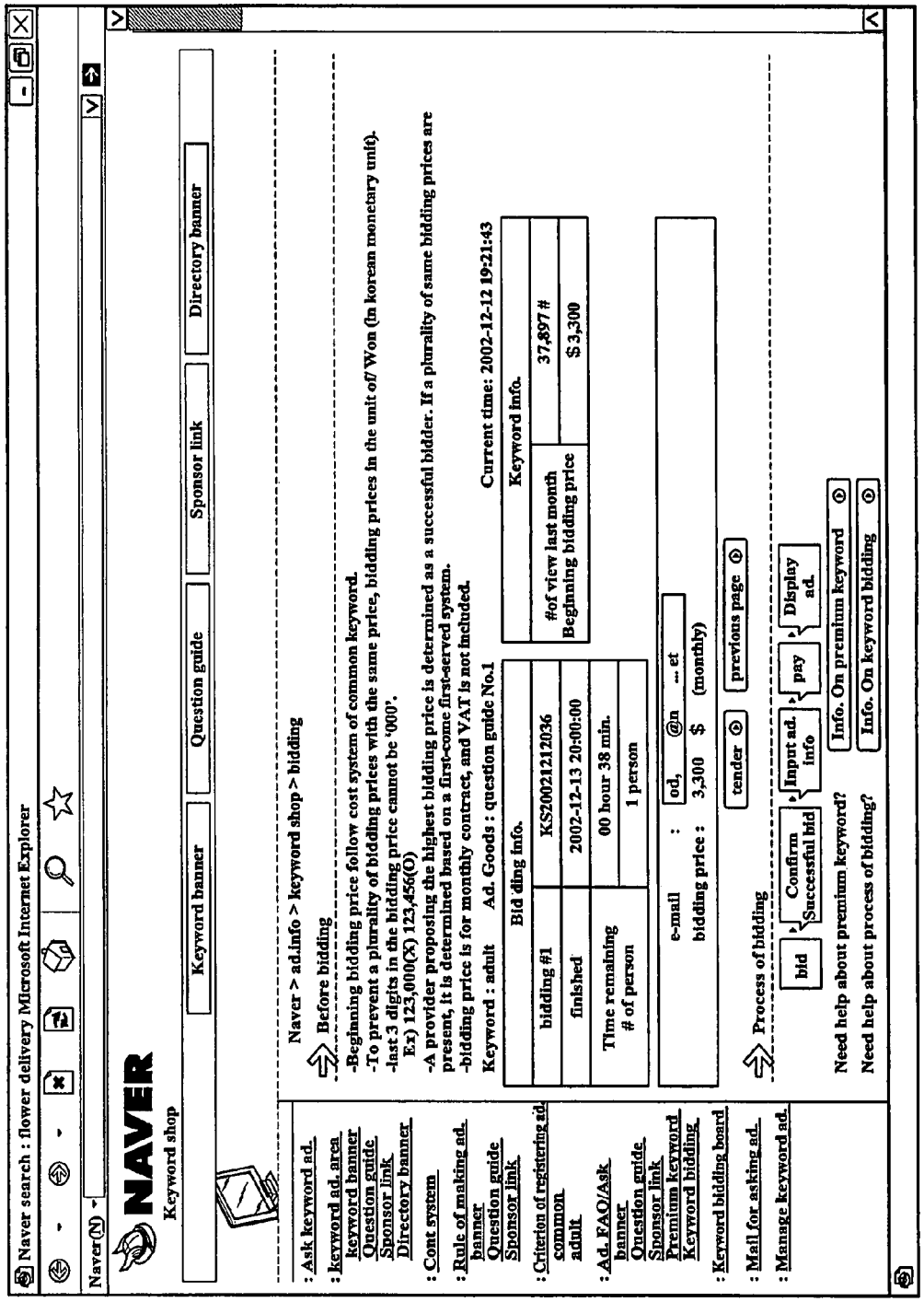
FIG. 4 is a view illustrating an example of a screen for receiving bidding prices from network information providers.

FIG. 4 is a view illustrating an example of a screen for receiving bidding prices from network information providers.

In step S230, after a predetermined tender period of time expires, a successful bidder is determined. The highest bidding price among at least one bidding price received from at least one network information provider becomes a successful bid price and a network information provider proposing the highest bidding price can be determined as a successful bidder. If a plurality of same bidding prices are present, there exist a variety of embodiments for determining a successful bidder. As one example, considering a tender order, a network information provider first bidding on a first-come first-served basis is determined as a successful bidder. Alternatively, if the predetermined display period of time is included in the tender conditions, a network information provider proposing the longest display period of time can be selected as a successful bidder. As another alternative embodiment, a network information provider having a high actual use result can be selected as a successful bidder with reference to a past actual advertisement use result of the network information provider, or a credit of a network information provider can be considered. As another alternative embodiment, a successful bidder can be selected through a lottery or a re-tender.

As another alternative embodiment, in step S210, if the search list order display method included in the tender conditions is specified by only the form of display, the placement position is not fixed at a particular position, but can be randomly arranged within a particular position zone. Namely, for a keyword, "flower delivery", when a keyword tender is performed for a form of display, "knowledge search result", a search list order associated with a successful bidder can be arranged within a placement zone of "knowledge search result", regardless of ranking. Alternatively, a plurality of network information providers are selected as successful bidders, positions of search list orders associated with the successful bidders can be determined according to bidding prices of the successful bidders in consideration of positions (ranking) within the "knowledge search result" placement zone.

Figure 5:
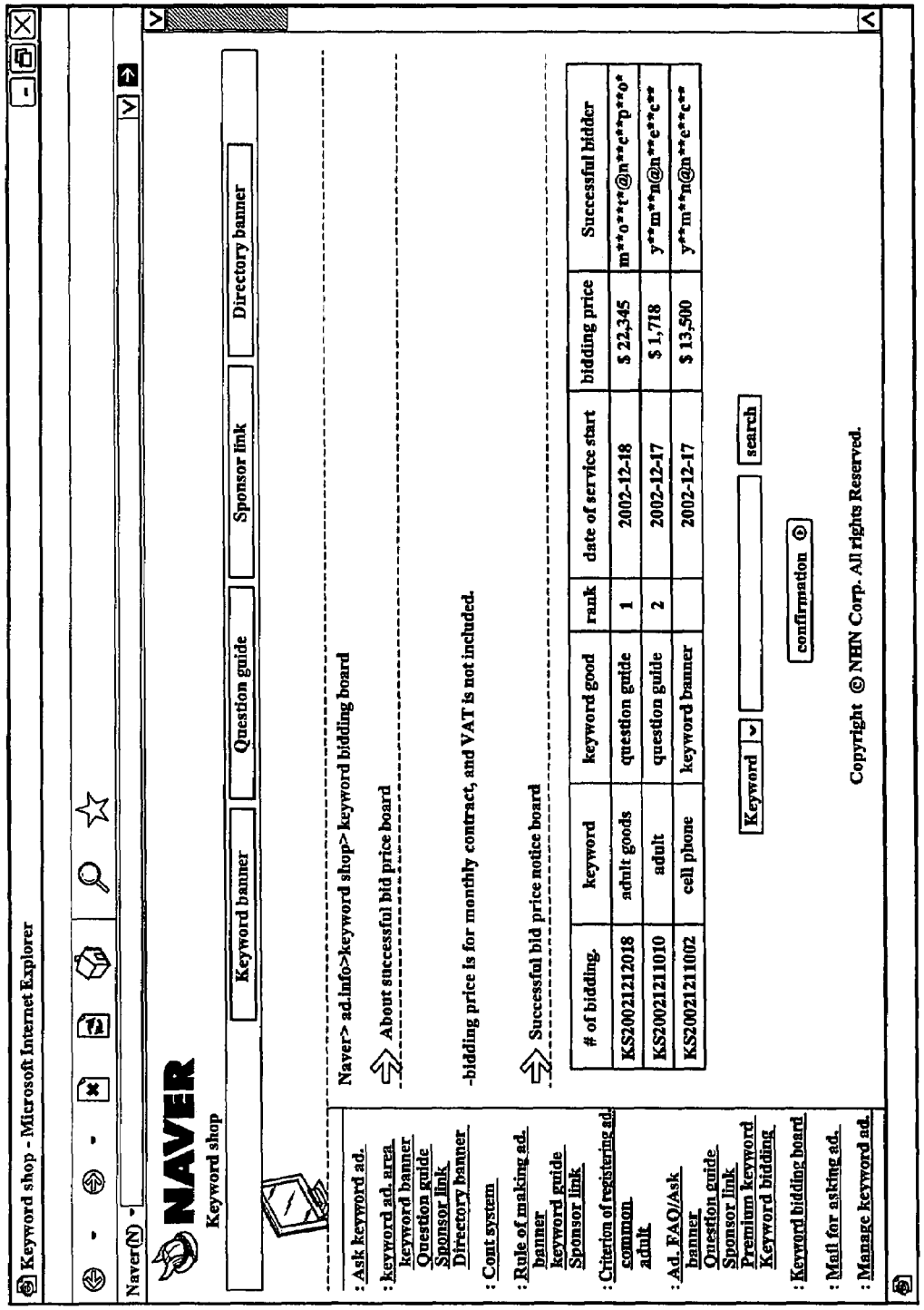
FIG. 5 is a view illustrating an example of a public notice board for the highest bid price.

In step S240, the successfully bidden network information provider (successful bidder) is notified of the determined successful bid result. All network information providers participating in the successful bid are also notified of the successful bid result. Alternatively, the successful bid result is opened to everybody through a highest bid price notice board as shown in FIG. 5. As an example of a method for noticing the successful bid result, a wired telephone or e-mail can be used or a short message service (SMS) used for current mobile telephone services can be used. The successful bid result can selectively include success or failure of bid, information on a successful bidder, the highest bid price, the total number of bidder, an e-mail address of a successful bidder, a site address (URL) of the highest bid price notice board, and the like.

In step S250, a purchase opportunity is offered to the successful bidder. As a preferred embodiment for offering the purchase opportunity, a purchase key is offered to only the successful bidder in order to grant a purchase right to him/her, and the successful bidder receiving the purchase key pays the highest bid price or settles it by means of a credit card to thereby complete the keyword purchase.

After the procedure for the successful bid, when purchase rejection intention is received from the successful bidder, it is considered as an unsuccessful bid. As an alternative embodiment, when a period of time within which the successful bidder can purchase the successfully bidden keyword goods is limited to a predetermined period of time, if the keyword good is not purchased within the period of time, it is considered as an unsuccessful bid immediately or after the purchase rejection intention is again confirmed after the period of time expires.

The keyword goods for which a successful bid has not been made can be again sold on a certain selling system, for example, the first-come first-served system or the re-tender system (step S260). As an alternative embodiment, when the keyword goods purchase has been unsuccessfully bidden, a network information provider proposing a bidding price of the second ranking can be determined as a new successful bidder, or, if an unsuccessful bid is made for the bidding price of the second ranking again, a network information provider proposing a bidding price of the third or next ranking can be determined as a new successful bidder.

As a further embodiment for the tender system as shown in FIG. 2, if the keyword good purchase is unsuccessfully bidden by the purchase rejection intention of the successful bidder, the step of determining justness of the purchase rejection intention and reflecting the results of the determination in credit of the successful bidder can be additionally included.

As a still further embodiment for the tender system as shown in FIG. 2, before the tender starts, the step of determining the lowest limit bidding price can be additionally included. When the lowest limit bidding price is determined, the tender for only a bidding price over the lowest limit bidding price can be performed. As an example for determining the lowest limit bidding price, the previous highest bid price or a certain portion thereof (for example, −25% of the previous highest bid price) can be set to the lowest limit bidding price.

As a still further embodiment, when the number of page views (PVs) for a keyword is considered, or additionally, a basic unit price per page view is fixed, the lowest limit bidding price can be determined as multiplication of PVs by the basic unit price. The basic unit price depends on the form of display or the ranking of search list order (for example, 100 won/PV in the case of knowledge search result, and 70 won/PV in the case of sponsor link). Alternatively, in addition to the page view and the basic unit price, a weight reflecting a preference on a keyword can be considered in determining the lowest limit bidding price. Accordingly, by relatively increasing a weight for a keyword popular due to a good advertisement effect, the lowest limit bidding price can be reasonably determined for each keyword.

As a still further embodiment for the tender system as shown in FIG. 2, the step of opening the highest bidding price or a bidding price list during the tender period of time can be additionally included. In addition, in order to prevent a tender considering the highest bidding price from rushing immediately before the tender period of time is ended, the highest bidding price or the bidding price list may not be opened during a predetermined period of time before the tender period of time is ended.

As a still further embodiment for the tender system as shown in FIG. 2, by offering a keyword similar to a keyword received from a network information provider participating in the tender procedure to the network information provider, the step of performing the tender for the similar keyword can be additionally included.

As a still further embodiment for the tender system as shown in FIG. 2, the step of receiving tender deposit money from a network information provider is additionally included. If the network information provider selected as a successful bidder rejects a keyword purchase, the tender deposit money is offset, or if the network information provider is selected as a successful bidder, remaining difference except the tender deposit money from the highest bid price can be paid.

As a still further embodiment for the tender system as shown in FIG. 2, when an instant purchase price is calculated and offered to network information providers and the instant purchase price is received as a bidding price from a network information provider, the step of instantly selecting the network information provider as a successful bidder can be additionally included. As an example for calculating the instant purchase price, it can be determined in consideration of bid prices of corresponding keyword goods heretofore. For example, assuming that the highest bid price of the corresponding keyword goods is 200 millions won in January, 350 millions won in February and 400 millions won in March, a weigh of 1:2:3 is given to said amounts of money to order to obtain an average amount of money and then an instant purchase price in April can be calculated as 300% of the average amount of money.

As a still further embodiment for the tender system as shown in FIG. 2, the step of offering a result for a search request associated with a keyword knocked down to a successful bidder can be additionally included. Namely, a result for a search request for a bidden keyword received from searchers during a predetermined period of time can be offered to a successful bidder. The result for the search request can selectively include the number of exposures to the bidden keyword, the number of clicks, and a click rate.

Figure 6:
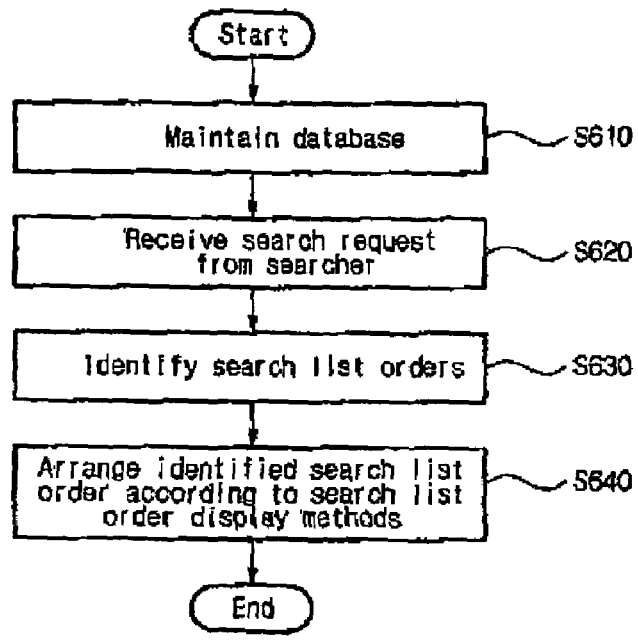
FIG. 6 is a flowchart illustrating a procedure for generating a search result list in accordance with a preferred embodiment of the present invention.

FIG. 6 is a flowchart illustrating a method for generating a search result list by maintaining a database including a search list order associated with a bidden keyword and arranging the search list order according to a predetermined search list order display method, in addition to the tender system of FIG. 2, in accordance with a preferred embodiment of the present invention. Now, a procedure to be performed in each step will be described in detail with reference to FIG. 6.

Figure 7:
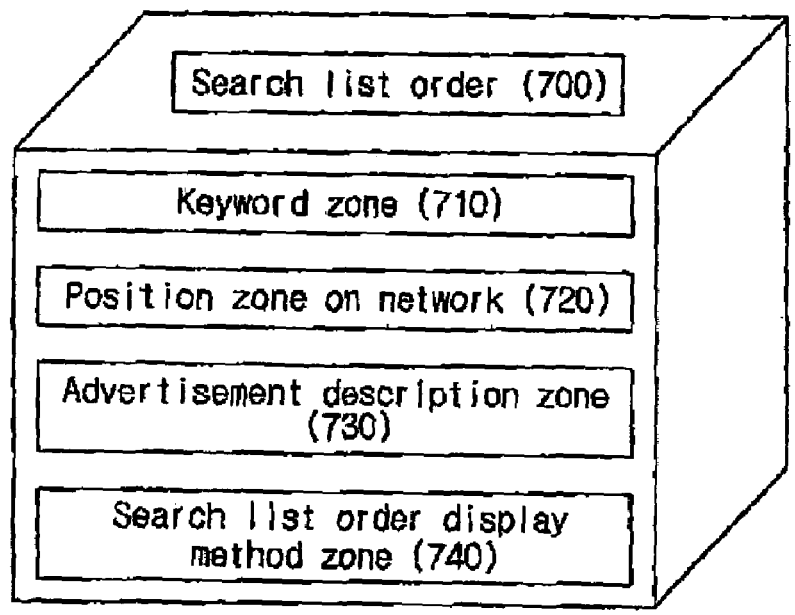
FIG. 7 is a view illustrating an example of a structure of a search list order.

First, in step S610 where a database including a search list order is maintained, a procedure for associating the search list order with a bidden keyword and a predetermined search list order display method and the like is included. FIG. 7 shows an example of the search list order, where each search list order 700 includes a keyword zone 710, a position zone on network 720, an advertisement description zone 730 and a search list order display method zone 740. The keyword zone 710 includes one or more keywords as an identifier for identifying a particular search list order from a plurality of search list orders. The position zone on network 720 includes a URL address associated with network information providers and offers the URL to a user's browser program when the user clicks a hyperlink offered in the search list order. The advertisement description zone 730 is a brief description for contents of web sites of network information providers and can be displayed on a screen as a part of an advertisement in the search list order. The search list order display method zone 740 can be specified by the form of display or the ranking of the search list order as described earlier.

Next, in step S620, a search request is received from a searcher (or network user). When the search is requested, a keyword or information associated with the keyword is received from the searcher.

Step S630 is the step of searching and identifying search list orders associated with keywords corresponding to the search request from the database. The procedure for searching the database and identifying the search list orders can be easily implemented by a processing between a general computer and the database.

Step S640 is the step of arranging the identified search list orders according to a predetermined search list order display method. According to a preferred embodiment of the present invention, at least a portion of a plurality of identified search list orders associated with a keyword is arranged according to the search list order display method in accordance with the present invention and remaining search list orders are arranged independent of the search list order display method. As an example of the independent arrangement method, the number of inquiries about a web site of a network information provider associated with a search list order, usefulness of information notified on the site, a degree of completion of the site and the like can be considered.

Figure 8:
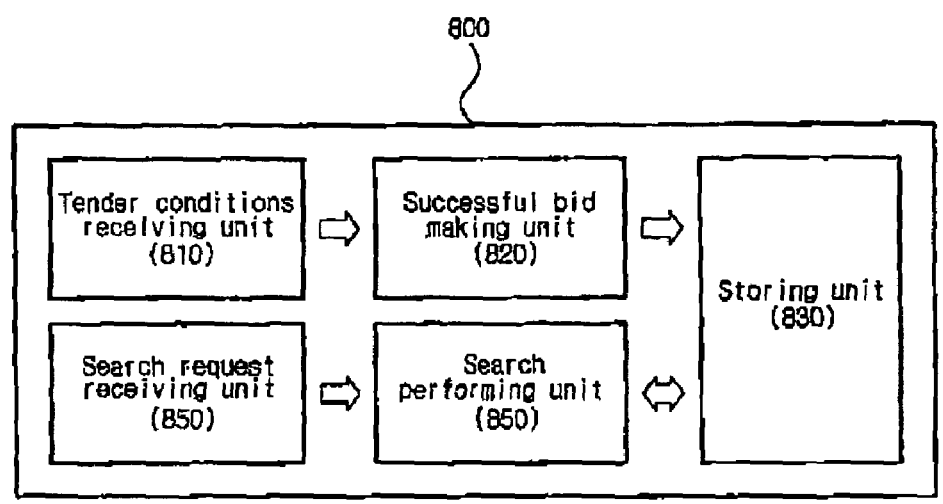
FIG. 8 is a view illustrating an entire structure of a search result list generation system in accordance with the present invention.

FIG. 8 is a view illustrating an inner configuration of a search result list generation system 800 in accordance with the present invention.

As shown in FIG. 8, the search result list generation system 800 includes a tender condition receiving unit 810, a successful bid making unit 820, a storing unit 830, a search performing unit 840 and a search request receiving unit 850.

The tender condition receiving unit 810 receives tender conditions including a keyword and a search list order display method, and bidding prices from a network information provider. The search list order display method includes a form of display and ranking of the search list order or includes only the form of display. As another embodiment, the tender conditions additionally include information on a bidding network information provider. As a still further embodiment, a display period of time can be additionally included in the tender conditions.

The successful bid making unit 820 makes a successful bid for keyword based the tender conditions and the bidding prices received from the tender condition receiving unit 810. Many embodiments as described above in connection with the tender system shown in FIG. 2 are applicable to the successful bid for keyword.

The storing unit 830 includes a plurality of search list orders. Each search list order includes the keyword zone, the position zone on network, the advertisement description zone and the search list order display method zone, as shown in FIG. 7.

The search performing unit 840 associates the search list orders stored in the storing unit 830 with a successfully bidden keyword and search list order display method. Further, in response to a search request received from a searcher, search list orders having a keyword corresponding to the search request are identified and at least a portion of the search list orders is arranged according to the search list order display method.

The search request receiving unit 850 receives the search request from the searcher via a communication network. When the search is requested, a keyword or information associated with the keyword is received from the searcher and the received information is transferred to the search performing unit 840.

Figure 9:
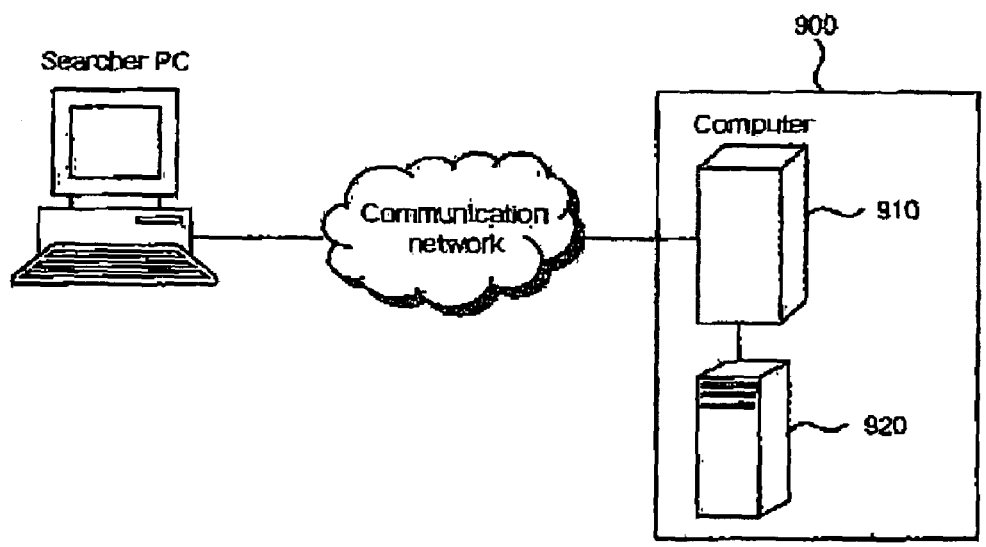
FIG. 9 is a block diagram illustrating an inner configuration of a search result list generation system in accordance with the present invention.

FIG. 9 shows an entire structure of a search result list generation system in accordance with the present invention. As shown in FIG. 9, a search result list generation system 900 includes a computer 910 and a database 920.

As a preferred example of the present invention, the computer 910 includes the tender condition receiving unit 810, the successful bid making unit 820, the search performing unit 840 and the search request receiving unit 850, and the database 920 includes the storing unit 830, shown in FIG. 8.

As another example, the database 920 can be included in the computer 910.

The computer 910 and the database 920 will be sufficiently implemented by a general purpose device.

The search result list generation system 900 is connected to a user's PC via a communication network and generates a search result list in response to a search request input from a searcher.

Figure 10A:
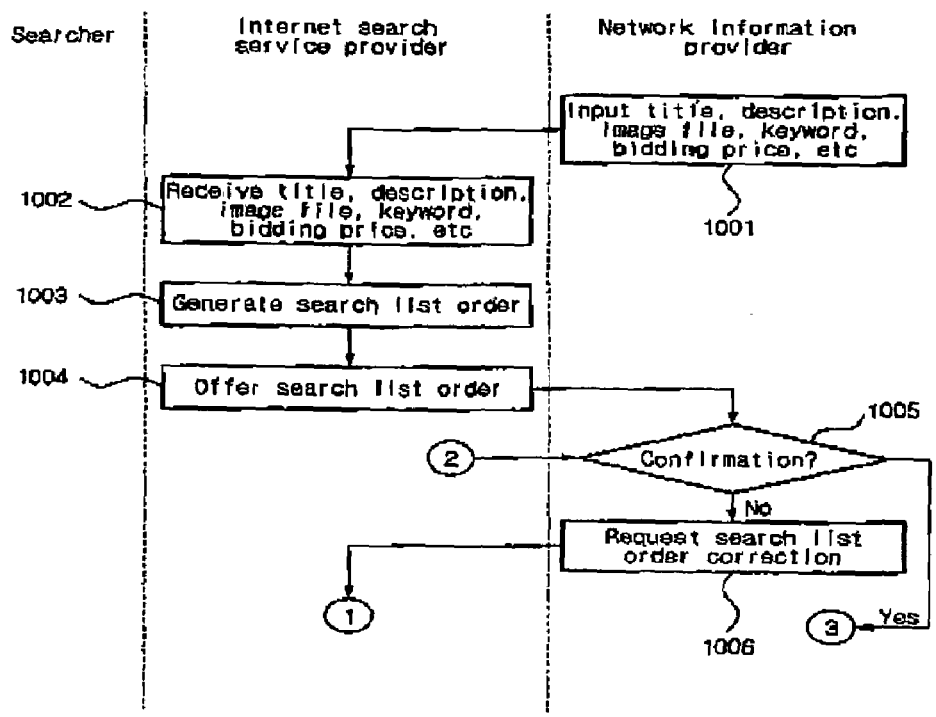
FIGS. 10a, 10b and 10c are flowcharts illustrating a procedure for receiving a search list order including an image file and a bidding price from network information providers and displaying a search list order associated with a successfully bidding network information provider on a certain zone when a search result is displayed in accordance with an embodiment of the present invention.
Figure 10B:
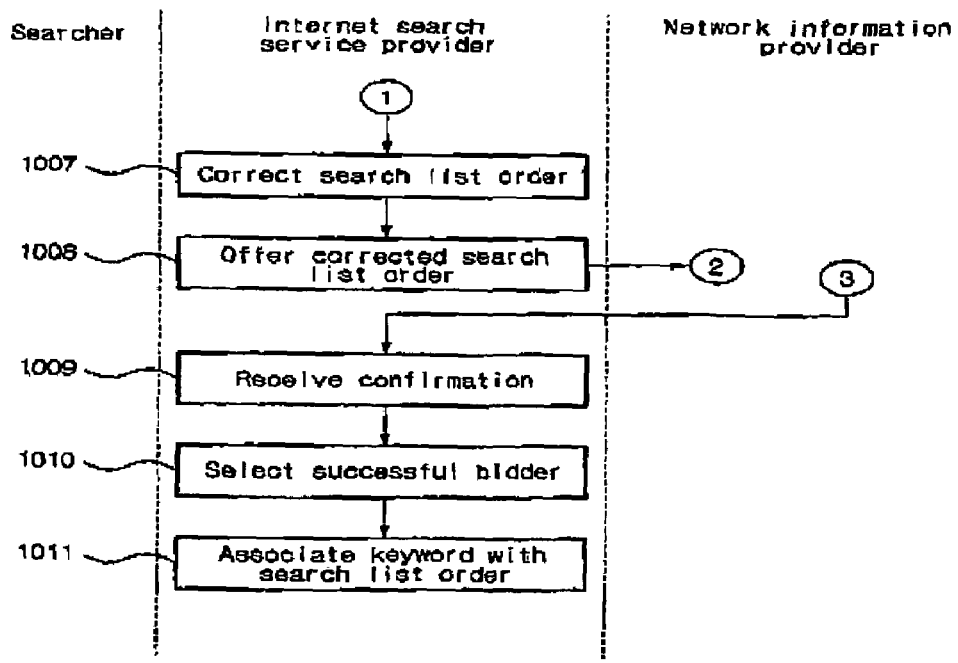
Figure 10C:
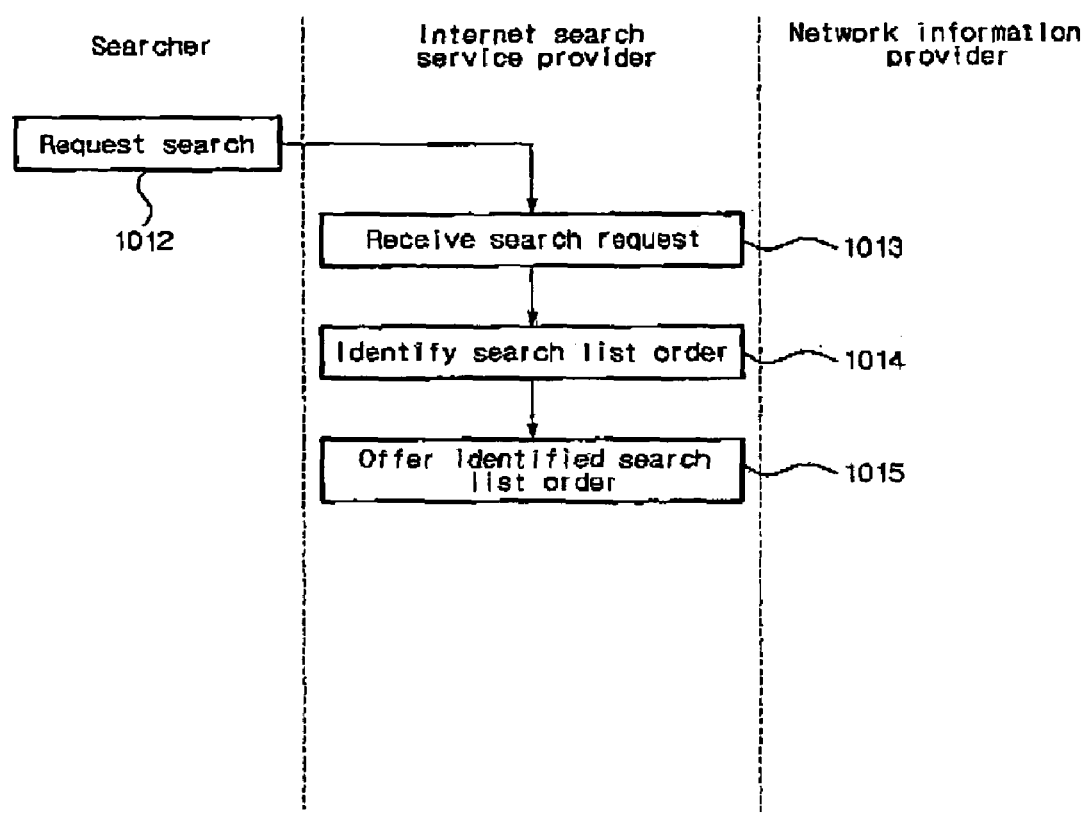

FIGS. 10a, 10b and 10c are flowcharts illustrating a procedure for receiving a search list order including an image file and a bidding price from network information providers and displaying a search list order associated with a successfully bidding network information provider on a certain zone when a search result is displayed in accordance with an embodiment of the present invention.

In step 1001, a network information provider accesses an Internet search engine server of an Internet search service provider and then inputs a keyword to be bidden and information required to generate a search list order. According to an embodiment of the present invention, the search list order, including an image file, is displayed to a searcher. This embodiment has an advantage in that the searcher's interest is concentrated on the search list order. The information input by the network information provider includes a keyword to be bidden, a title of his/her home page, a description about his/her home page, an image file associated with his/her home page, URL of his/her home page, and a bidding price. Moreover, according to another embodiment of the present invention, the information input by the network information provider includes an additional description about his/her home page, and contact information such as a telephone and address of the network information provider.

Figure 13:
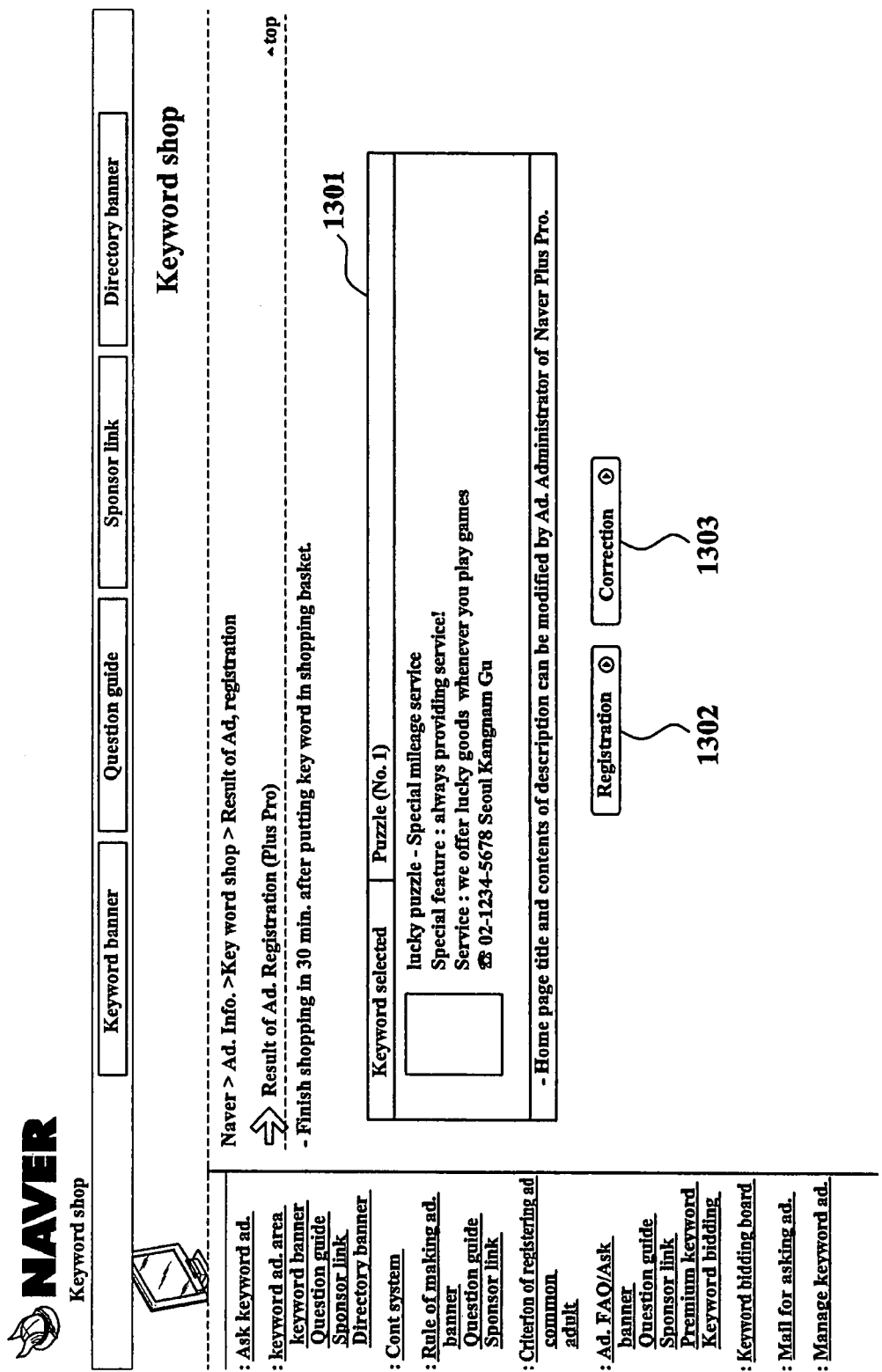
FIG. 13 is a view illustrating a screen for displaying a search list order to be offered to a searcher to network information providers in real time substantially based on the information on the search list order input from the network information providers.

In step 1002, the Internet search engine receives the search list order related information input by the network information provider in step 1001. In step 1003, the Internet search engine generates search list orders in real time substantially based on the title of the home page, the description about the home page, the image file, the URL, the additional description, the contact information and the like received from the network information provider. The generated search list orders are stored in a temporary search list order storing unit in real time substantially. The search list orders generated in step 1003 are offered to the network information provider in real time substantially. An example of the search list orders offered to the network information provider is shown in FIG. 13, which will be described later.

In step 1005, the network information provider checks whether the search list orders offered in step 1004 are to be corrected. After checking, if any correction is not required, a "confirmation" is selected, or if a correction is required, a "correction" is selected. If the "correction" is selected in step 1005, in step 1006, a search list order correction request from the network information provider is input to the Internet search engine via a communication network. In step 1007, the Internet search engine reflects the correction request from the network information provider to correct the search list orders in real time substantially. In step 1008, the corrected search list orders are offered to the network information provider in real time substantially, and the network information provider selects the "confirmation" or the "correction" again (step 1005).

If the network information provider selects the "confirmation" in step 1005, the "confirmation" selection is transferred to the Internet search engine (step 1009). Now, since the confirmation on the search list orders has been received from the network information provider, in step 1010, the Internet search engine selects one or more successful bidders among one or more network information providers who input the search list orders for one keyword based on input bidding prices. For example, for a keyword, "flower delivery," if the number of search list orders displayable on a particular zone of a search result web page is two, two search list orders are selected in higher ranking of bidding prices.

In step 1011, the search list orders are associated with the keyword. The association of the search list orders with the keyword is for identifying the search list orders when a searcher searches using the keyword. This step can be performed not only immediately after step 1010 but also after or before other steps as long as step 1011 can be performed without any problem.

In step 1012, the searcher requests a search to the Internet search engine through an access to the Internet search engine in order to input a keyword in a search window. The Internet search engine receives the search request in step 1013 and identifies search list orders associated with a keyword corresponding to the search request in step 1014. In step 1015, the identified search list orders are offered to the searcher by arranging them in a predetermined position of the search result web page.

According to a still further embodiment of the present invention, keywords and bidding prices are first received from network information providers, and after a successful bidder is selected based on the bidding prices, then, from the successful bidder, a title of his/her home page, a description about his/her home page, an image file associated with his/her home page, URL of his/her home page and the like are received. Since a method for correcting the search list orders and the others is the same as the embodiments described in connection with FIG. 10, a detailed description thereof will be omitted.

Figure 11:
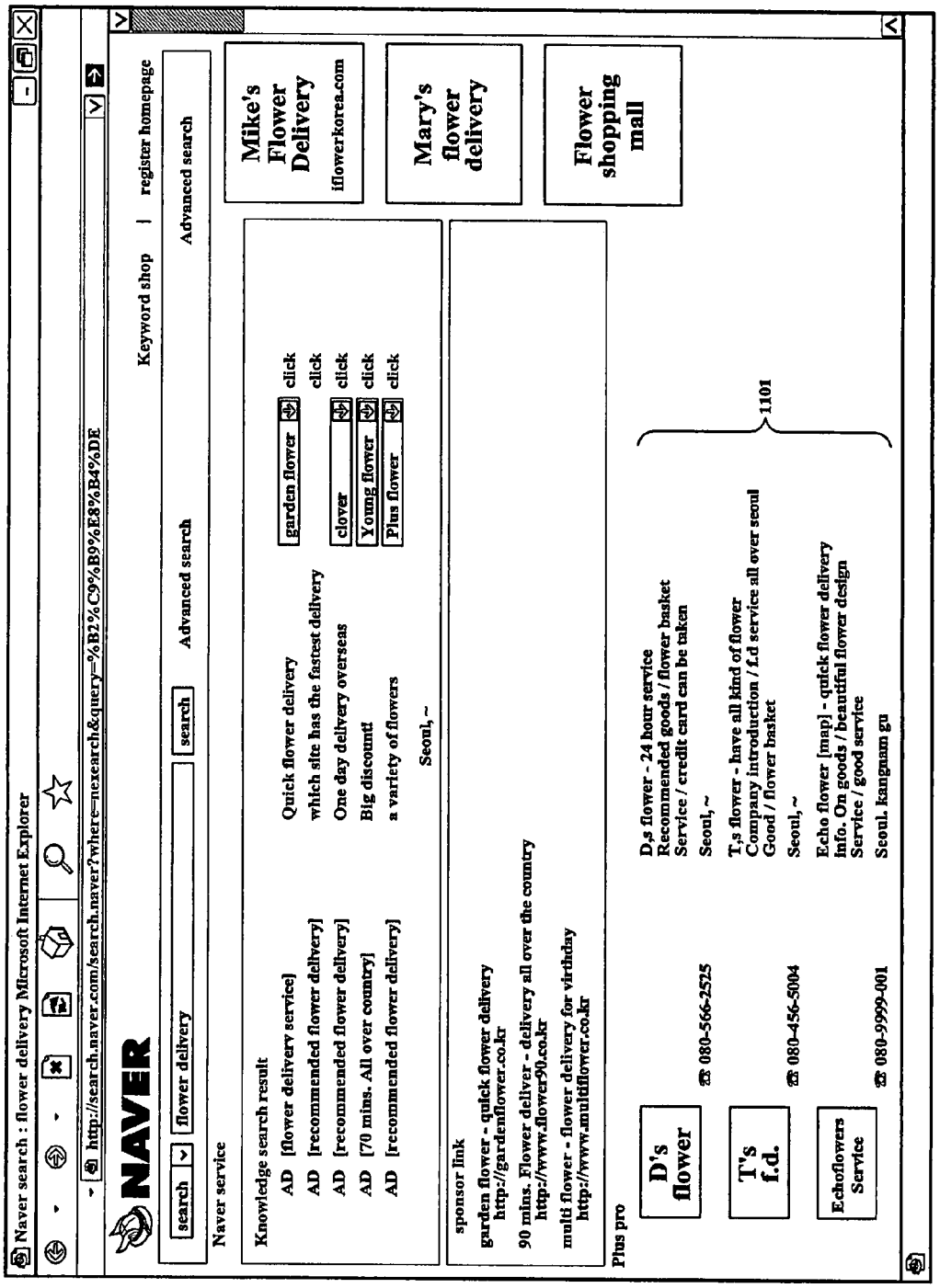
FIG. 11 is a view illustrating a screen for a search result displayed in accordance with the embodiment of FIGS. 10a, 10b and 10c.

FIG. 11 is a view illustrating a screen for a search result displayed in accordance with the embodiment of FIGS. 10*a*, 10*b* and 10*c*.

FIG. 11 shows an embodiment of the search result web page offered to the searcher in step 1015. The searcher input the keyword, "flower delivery" and the search list orders corresponding to the keyword were indicated by reference numeral 1101. The search list orders 1101 include image files, which attract the searcher's interest and hence raises a possibility that the searcher clicks the search list orders 1101.

Figure 12:
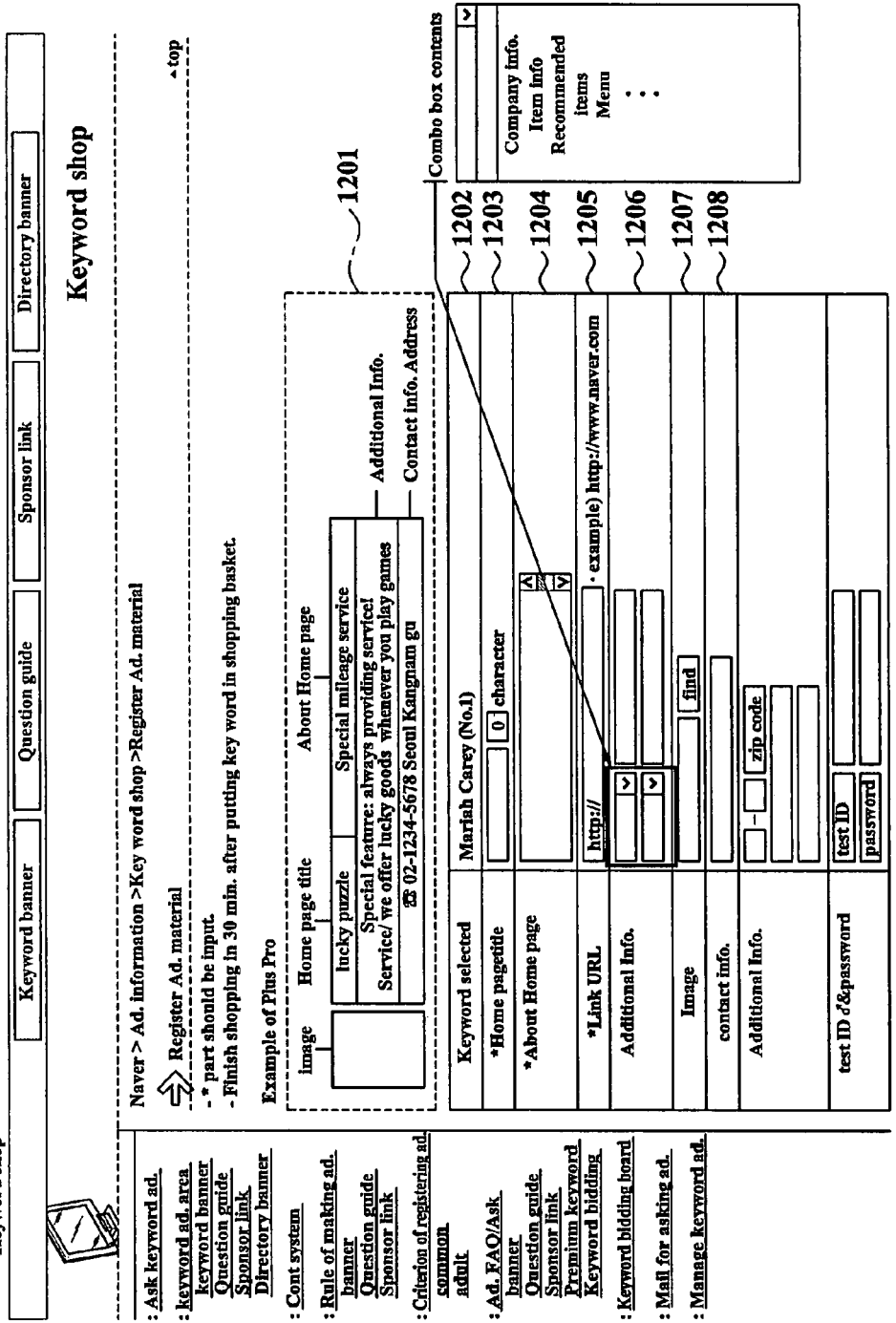
FIG. 12 is a view illustrating a screen for receiving information on a search list order from network information providers.

FIG. 12 is a view illustrating a screen for receiving information on search list orders from network information providers.

A search list order exemplification 1201 allows network information providers to have knowledge on how search list orders to be bidden are displayed according to a search result by exemplifying a form of display for the search list orders.

A selected keyword field 1202 indicates a keyword to be bidden by a network information provider. In this embodiment, when the network information provider selects a keyword to be bidden, a web page shown in FIG. 12 is displayed. According to this embodiment, since the network information provider first determines justness of the keyword, and then other information on the search list order is input, an input of unnecessary information on search list order can be eliminated.

A home page title field 1203 is a field for inputting a title of a web page offered by the network information provider. A home page description field 1204 is a field for inputting a description about the web page offered by the network information provider. A link URL field 1205 is a field for inputting a URL for a destination home page when a searcher clicks a search list order. An additional information field 1206 is a field for inputting additional information on the network information provider. An image field 1207 is a field for inputting a position of an image file to upload into the Internet search engine. The image file is transferred from a terminal of the network information provider to the Internet search engine server when the "confirmation" of the network information provider is input. A contact information field 1208 is used to receive contact information such as a telephone or an address associated with the network information provider. Furthermore, a search list order input screen includes a bidding price input field (not shown) for inputting bidding prices related to search list order from network information providers.

FIG. 13 is a view illustrating a screen for displaying search list orders to be offered to a searcher to network information providers in real time substantially based on the information on the search list orders input from the network information providers. The Internet search engine generates search list orders to be offered as a search result by using a title of web page, a description and an image file input from a network information provider, and then offers them to the network information provider, as shown in FIG. 13.

The network information provider checks the generated search list orders 1301, and if an additional correction is required, transmits a correction request to the network search engine by clicking a correction button 1303. The network search engine received the correction request offers a search list order correction screen web page to the network information provider so that he/she can correct contents of the search list orders.

As a result of checking of the generated search list orders 1301 by the network information provider, if it is determined that an additional correction is not required, the network information provider transmits "confirmation" information to the network search engine by clicking a registration button 1302. When the network search engine receives the "confirmation" information, the search list order information is stored in a search list order database.

Figure 14:
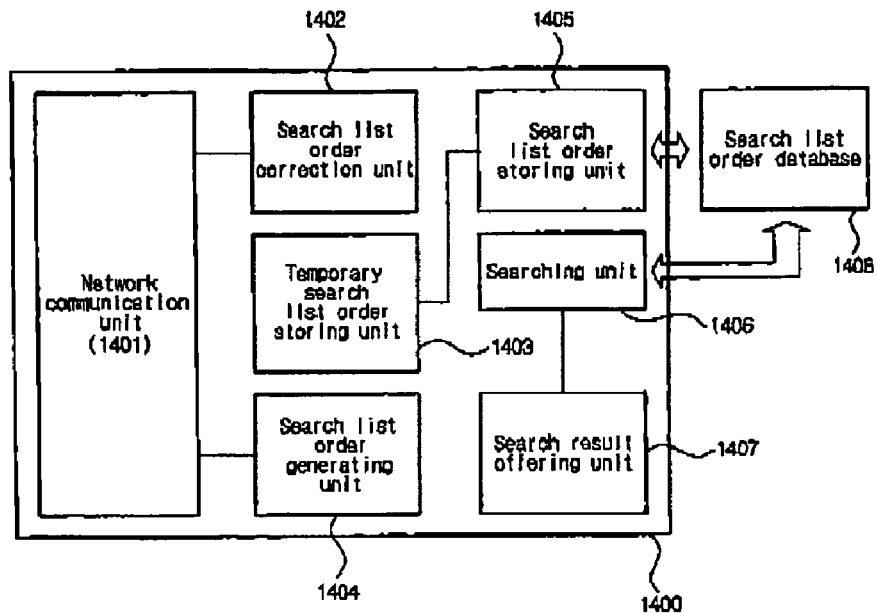
FIG. 14 is a view illustrating a search result list generation system for generating and storing a search list order in real time substantially based on the information offered by network information providers in accordance with an embodiment of the present invention.

FIG. 14 is a view illustrating a search result list generation system for generating and storing search list orders in real time substantially based on the information offered by network information providers in accordance with an embodiment of the present invention.

An Internet search engine 1400 includes a network communication unit 1401, a search list order correction unit 1402, a temporary search list order storing unit 1403, a search list order generating unit 1404, a search list order storing unit 1405, a searching unit 1406 and a search result offering unit 1407.

The network communication unit 1401 receives a search request from a searcher via a communication network and transfers a search result to a terminal of the searcher via the communication network. Further, the network communication unit 1401 receives information on a search list orders (including image files) from a network information provider via the communication network and transfers generated search list orders to a terminal of the network information provider via the communication network.

Based on the search list order information received from the network information provider through the network communication unit 1401, the search list order generating unit 1404 generates search list orders and the generated search list orders are stored in the temporary search list order unit 1403. The search list orders stored in the temporary search list order unit 1403 are provided to the terminal of the network information provider via a search list order offering unit (not shown) and the network communication unit 1401. The search list order offering unit performs a function to transfer the search list orders, which are generated or corrected through the search list order generating unit 1404 and the search list order correction unit 1402 and stored in the temporary search list order storing unit 1403, to the network communication unit 1401.

If the network information provider requests a correction for the search list orders, the correction request is received by the network communication unit 1401 and is transferred to the search list order correction unit 1402. The search list order correction unit 1402 corrects the search list orders stored in the temporary search list order storing unit 1403 and then provides the corrected search list orders for the network information provider.

When a "confirmation" input is received from the network information provider, the search list order storing unit 1405 stores the search list orders stored in the temporary search list order storing unit 1403 into the database 1408. A successful bid determining unit (not shown) selects a successful bidder based on bidding prices among the search list orders associated with the same keyword and stored in a search list order database 1408.

The search request input from the searcher via the network communication unit 1401 is transferred to the searching unit 1406, which identifies the search list orders associated with a matched keyword with reference to the search list order database 1408. The identified search list orders are arranged in a predetermined position of a search result web page and are offered to the searcher by means of the search result offering unit 1407.

In the present invention, communication between each terminal, the Internet search engine and servers is performed using a HTTP protocol and other Internet protocols.

In addition, embodiments of the present invention further relate to computer readable/recordable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable/recordable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. Examples of program instructions include both machine code, such as produced by a compiler, and files containing higher level code that may be executed by the computer using an interpreter.

Figure 15:
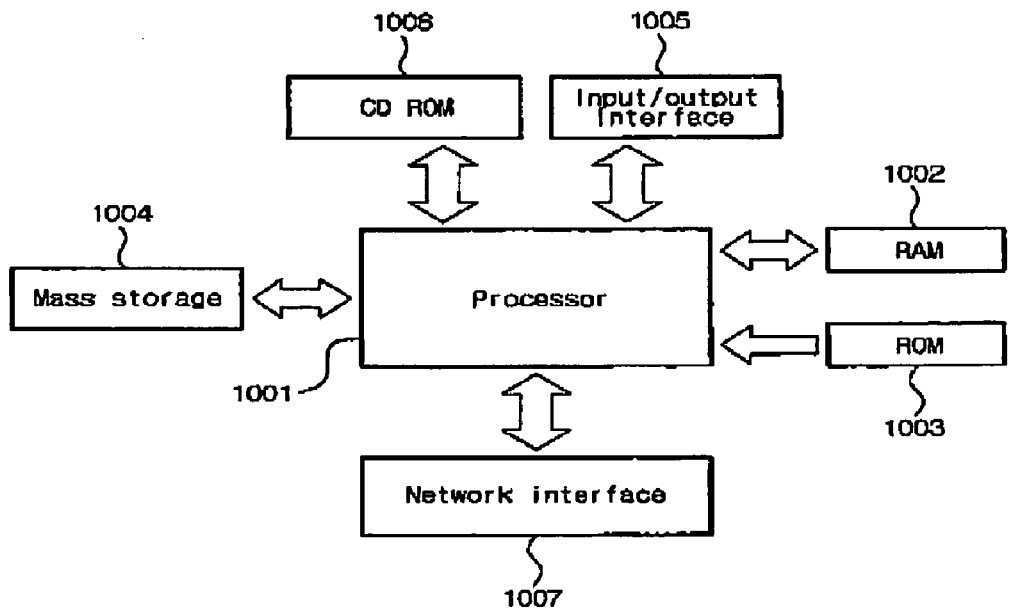
FIG. 15 is a block diagram illustrating an inner structure of a general purpose computer adoptable for performing a search list generation method in accordance with the present invention.

FIG. 15 illustrates a typical computer system in accordance with an embodiment of the present invention. The computer system 1500 includes any number of processors 1501 (also referred to as central processing units, or CPUs) that are coupled to storage devices including primary storage 1502 (typically a random access memory, or "RAM"), primary storage 1503 (typically a read only memory, or "ROM"). As is well known in the art, primary storage 1503 acts to transfer data and instructions uni-directionally to the CPU and primary storage 1502 is used typically to transfer data and instructions in a bi-directional manner. Both of these primary storage devices may include any suitable type of the computer-readable media described above. A mass storage device 1504 is also coupled bi-directionally to CPU 1501 and provides additional data storage capacity and may include any of the computer-readable media described above. The mass storage device 1504 may be used to store programs, data and the like and is typically a secondary storage medium such as a hard disk that is slower than primary storage. A specific mass storage device such as a CD-ROM 1506 may also pass data uni-directionally to the CPU.

Processor 1501 is also coupled to an interface 1505 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 1501 optionally may be coupled to a computer or telecommunications network using a network connection as shown generally at 1507. With such a network connection, it is contemplated that the CPU might receive information from the network, or might output information to the network in the course of performing the above-described method steps. The above-described devices and materials will be familiar to those of skill in the computer hardware and software arts.

The hardware elements described above may be configured (usually temporarily) to act as one or more software modules for performing the operations of this invention.

The steps described as the embodiments in the present invention can be configured to be arranged and performed in a sequence different from that in the above embodiment within the spirit and scope of the present invention.

Although the present invention has been described in connection with the particular embodiments, it should be understood that various modifications and changes may be made without departing from the scope and spirit of the invention. Therefore, the present invention should be defined by the claims and equivalents thereof, not the particular embodiments.

INDUSTRIAL APPLICABILITY

As described above, according to the present invention, a variety of keyword display methods can be offered in generating a search result list in response to a search request via a communication network. Accordingly, effective advertisement marketing through a keyword search is offered to network information providers.

According to the present invention, keyword purchase competition between network information providers can be mitigated and the network information providers can easily purchase keyword goods.

According to the present invention, the network information providers can display at least some of search list orders of a search result list as a search result specified by the network information providers according to a tender system.

According to the present invention, since positions of search list orders associated with the network information providers are initially fixed or are constantly maintained, network users can estimate an advertisement effect.

According to the present invention, since a tender is individually performed for each keyword and search list order display method, there can occur a reverse phenomenon that the highest bid price for a search list order of a low ranking is higher than the highest bid price for a search list order of a high ranking.

According to the present invention, images included in search list orders attract a searcher's interest and allows network information providers to easily input and correct information on the search list orders.

The invention claimed is:

1. A computer implemented method for generating a search result list in response to a search request input from a searcher through a communication network, comprising the steps of:
   determining a lowest limit bidding price for each of a plurality of keywords by a processor, the lowest limit bidding price being determined in consideration of at least one of a number of page views for each keyword, a basic unit price per one page view and a weight associated with a preference for the each keyword;
   receiving bidding prices higher than or equal to the lowest limit bidding price and tender conditions including the keyword and a predetermined search listing display method for a search listing from each of a plurality of network information providers, wherein the received bidding prices are hidden from each of the plurality of network information providers;
   determining successful bids of the network information providers for the keyword based on the tender conditions and the bidding prices, to sell a keyword good associated with the predetermined search listing display method through a tender;
   associating at least one portion of the search listings with the keyword and the predetermined search listing display methods, to maintain a database including a plurality of search listings;
   receiving a search request from a searcher;
   identifying search listings associated with keywords corresponding to the search request;
   arranging said at least one portion of the search listings according to the predetermined search listing display methods of the successful bids when arranging the identified search listings; and
   generating the search result list including the arranged at least one portion of the search listings.

2. The method as claimed in claim 1, wherein the predetermined search listing display methods are specified by a form of display and ranking of the search listings.

3. The method as claimed in claim 1, wherein said at least one portion of the search listings is randomly arranged in a placement zone specified by the search listing display method when arranging said at least one portion of the search listings.

4. The method as claimed in claim 1, wherein predetermined keywords are sold during only a predetermined period of time through the tender.

5. The method as claimed in claim 1, wherein the step of selling the keywords through the tender is individually performed for each of said at least one portion of the search listings.

6. The method as claimed in claim 1, wherein remaining search listings except said at least one portion of the search listings are arranged independent of the predetermined search listing display method.

7. The method as claimed in claim 1, wherein the keywords sold through the tender are premium keywords determined by a predetermined criterion.

8. The method as claimed in claim 1, wherein the tender conditions selectively further include information on network information providers or a predetermined display period of time.

9. A computer implemented method for generating a search result list in response to a search request input from a searcher through a communication network, comprising the steps of:
   maintaining a plurality of search listings including URLs associated with network information providers;
   determining a lowest limit bidding price for each keyword by a processor, the lowest limit bidding price being determined in consideration of at least one of a number of page views for each keyword, a basic unit price per one page view and a weight associated with a preference for the each keyword;
   receiving keywords associated with the search listings and bidding prices associated with the keywords from the network information providers, the bidding prices being higher than or equal to the lowest limit bidding price, wherein the received bidding prices are hidden from the network information providers;
   selecting a successful bidder among a plurality of network information providers associated with the keywords according to a predetermined criterion associated with the bidding prices after a tender period of time expires, wherein the tender period of time is a period of time in which the bidding prices are accepted; and
   generating a search result list including at least a portion of the plurality of search listings in response to the search request,
   wherein at least one portion of the plurality of search listings is arranged in a predetermined search listing placement position.

10. The method as claimed in claim 9, wherein the search listing placement position is determined before the bidding prices are received from the network information providers.

11. The method as claimed in claim 10, further comprising the step of receiving information on a predetermined display period of time from the network information providers,
   wherein when the network information providers are selected as a successful bidder, search listings associated with the network information providers are arranged in the predetermined search listing placement position during the predetermined display period of time, and a position of the arranged search listings is not changed.

12. The method as claimed in claim 9, wherein the step of selecting the successful bidder includes selecting a plurality of the network information providers as successful bidders,
   wherein said at least one portion of the search listings is arranged according to rankings determined by the bidding prices of the successful bidders within a placement zone specified by the search listing display methods.

13. The method as claimed in claim 9, further comprising the steps of:
   offering instant purchase prices to network information providers; and
   instantly selecting the network information providers as successful bidders when the instant purchase prices are received as the bidding prices from network information providers.

14. The method as claimed in claim 13, wherein the instant purchase prices are determined in consideration of past successful bid prices of the keywords.

15. The method as claimed in claim 9, wherein the step of selecting the successful bidder further includes the step of regarding a successful bid as an unsuccessful bid in at least one of the followings:
   a case where a purchase rejection intention is received from the successful bidder,
   a case where the successful bidder does not purchase a successful bidden keyword within a predetermined period of time, and
   a case where a purchase rejection intention is once again received after the predetermined period of time expires.

16. The method as claimed in claim 15, further comprising the step of reselling keywords if the successful bid is regarded as an unsuccessful bid, wherein the step of reselling the keywords includes one of a first-come first-served system, a re-tender system and a next order bidding price selection system.

17. The method as claimed in claim 9, wherein when a plurality of same bidding prices are received, the successful bidder is selected in consideration of at least one of a tender sequence, a display period of time, an actual advertisement use result, a credit of network information providers.

18. The method as claimed in claim 9, further comprising the step of opening the highest bidding price or a bidding price list.

19. The method as claimed in claim 18, wherein the highest bidding price or the bidding price list is not opened during a predetermined period of time before a tender period of time expires.

20. The method as claimed in claim 9, further comprising the step of offering keywords similar to keywords received from the network information providers to the network information providers.

21. The method as claimed in claim 9, wherein the step of receiving the bidding prices includes the step of limiting the number of receipt of bidding prices from same network information providers to the predetermined number of times or demanding an additional price when bidding prices are received above the predetermined number of times.

22. The method as claimed in claim 9, further comprising the step of offering a result for the search request associated with the keywords to the successful bidder,
wherein the result for the search request includes at least one of the number of exposures, the number of clicks and a click rate.

23. The method as claimed in claim 9, wherein the step of maintaining the plurality of search listings includes the step of maintaining search listings including URLs associated with network information providers and image files associated with the network information providers.

24. The method as claimed in claim 23, wherein at least one portion of the search listings arranged in the predetermined search listing placement position is arranged with the image files included.

25. A computer implemented method for generating a search result list in response to a search request input from a searcher through a communication network, comprising the steps of:
determining a lowest limit bidding price for each keyword by a processor, the lowest limit bidding price being determined in consideration of at least one of a number of page views for each keyword, a basic unit price per one page view and a weight associated with a preference for the each keyword;
receiving web page titles, web page descriptions, image files, keywords and bidding prices associated with web pages of the network information providers from network information providers, the bidding prices being higher than or equal to the lowest limit bidding price, wherein the received bidding prices are hidden from the network information providers;
generating search listings in real time substantially by combining the web page titles, the web page descriptions and the image files, and offering the generated search listings to the network information providers;
receiving confirmation inputs of the network information providers for the generated search listings;
selecting a successful bidder among a plurality of network information providers that provided confirmation inputs, wherein the successful bidder is selected according to a predetermined criterion associated with the bidding prices;
associating the keywords with the search listings of the successful bidders;
receiving a search request from the searcher;
identifying search listings associated with a keyword corresponding to the search request; and
offering the identified search listings to the searcher by arranging the identified search listings in a predetermined position of a search result web page.

26. The method as claimed in claim 25, further comprising the steps of:
receiving a correction request for one or more of web page titles, web page descriptions and image files from the network information providers; and
correcting the search listings in real time substantially in response to the correction request and offering the corrected search listings to the network information providers.

27. A computer implemented method for generating a search result list in response to a search request input from a searcher through a communication network, comprising the steps of:
determining a lowest limit bidding price for each keyword by a processor, the lowest limit bidding price being determined in consideration of at least one of a number of page views for each keyword, a basic unit price per one page view and a weight associated with a preference for the each keyword;
receiving keywords and bidding prices from network information providers, the bidding prices being higher than or equal to the lowest limit bidding price, wherein the received bidding prices are hidden from the network information providers;
selecting a successful bidder among a plurality of network information providers associated with the keywords, wherein the successful bidder is selected according to a predetermined criterion associated with the bidding prices;
receiving a web page title, a web page description and an image file associated with a web page of the successful bidder from the successful bidder;
generating a search listing in real time substantially by combining the web page title, the web page description and the image file, and offering the generated search listings to the successful bidder;
receiving a confirmation input of the successful bidder for the generated search listing;
associating the keywords with a plurality of the confirmed search listings;
receiving a search request from the searcher;
identifying search listings associated with a keyword corresponding to the search request; and
offering the identified search listings to the searcher by arranging the identified search listings in a predetermined position of a search result web page.

28. The method as claimed in claim 27, further comprising the steps of:
receiving a correction request for one or more of a web page title, a web page description and an image file from the successful bidder; and
correcting the search listings in real time substantially in response to the correction request and offering the corrected search listings to the successful bidder.

29. A system for generating a search result list in response to a search request input from a searcher through a communication network, comprising:
- a first computing device having a processor and a memory, the computing device connected to a second computing device over a computer network; and
- an executable application residing in the memory for generating the search result list over the computer network, the executable application comprising:
  - a network information provider inputting a bidding price into the system for generating a search result list;
  - a tender conditions receiving unit for receiving tender conditions including keywords and search listing display methods, and the inputted bidding prices higher than or equal to a lowest limit bidding price from network information providers, the lowest limit bidding price being determined for each keyword and determined in consideration of at least one of a number of page views for each keyword, a basic unit price per one page view and a weight associated with a preference for the each keyword, wherein the received bidding prices are hidden from the network information providers;
  - a successful bid making unit for making a successful bid for the keywords based on the tender conditions and the bidding prices;
  - a storing unit including a plurality of search listings;
  - a search performing unit for:
    - associating the plurality of the search listings with the successfully bidden keywords and search listing display methods;
    - identifying search listings having the keywords corresponding to the search request in response to a search request received from a searcher; and
    - arranging at least one portion of the search listings according to the search listing display methods; and
  - a search request receiving unit for receiving a search request from a searcher via a communication network.

30. A computer-readable recording medium in which a program for implementing a method according to claim 1 in a computer is recorded.

* * * * *